US009674640B2

(12) United States Patent
Mannan (10) Patent No.: US 9,674,640 B2
(45) Date of Patent: Jun. 6, 2017

(54) METHOD AND SYSTEM FOR VICARIOUS DOWNLOADING OR UPLOADING OF INFORMATION

(71) Applicant: Google Technology Holdings LLC, Mountain View, CA (US)

(72) Inventor: Azimul Mannan, Darjeeling (IN)

(73) Assignee: Google Technology Holdings LLC, Mountain View, CA (US)

( * ) Notice: Subject to any disclaimer, the term of this patent is extended or adjusted under 35 U.S.C. 154(b) by 790 days.

(21) Appl. No.: 14/065,239

(22) Filed: Oct. 28, 2013

(65) Prior Publication Data

US 2014/0201319 A1 Jul. 17, 2014
US 2015/0012610 A9 Jan. 8, 2015

Related U.S. Application Data

(63) Continuation of application No. PCT/US2012/033197, filed on Apr. 12, 2012.

(30) Foreign Application Priority Data

Apr. 29, 2011 (IN) ............................ 1496/CHE/2011

(51) Int. Cl.
*H04W 4/00* (2009.01)
*H04M 1/725* (2006.01)
*H04W 4/02* (2009.01)

(52) U.S. Cl.
CPC ......... *H04W 4/005* (2013.01); *H04M 1/7253* (2013.01); *H04M 2250/64* (2013.01); *H04W 4/02* (2013.01)

(58) Field of Classification Search
CPC ..... H04W 4/005; H04W 4/02; H04M 1/7253; H04M 2250/64
See application file for complete search history.

(56) References Cited

U.S. PATENT DOCUMENTS 6,493,758 B1 * 12/2002 McLain ............ G06F 17/30899
707/E17.119
7,165,224 B2 1/2007 Phyalammi
(Continued)

FOREIGN PATENT DOCUMENTS

CN 1770897 5/2006
KR 20080006147 1/2008

OTHER PUBLICATIONS

"Foreign Office Action", KR Application No. 10-2013-7028091, Aug. 27, 2015, 5 pages.
(Continued)

*Primary Examiner* — Oanh Duong
(74) *Attorney, Agent, or Firm* — Wolfe-SBMC (57) ABSTRACT

Methods and systems for vicarious downloading or uploading of information are disclosed herein. In one embodiment, such a system involves a mobile device that includes a memory device capable of storing information or content, and at least one wireless communication component. The mobile device further includes a processing device coupled at least indirectly to the memory device and to the at least one wireless communication component, and a power source. The processing device is configured to determine at least one characteristic/condition pertaining in at least some manner to the mobile device. Also, the mobile device is configured to send a command message to another device when the at least one characteristic/condition is determined, the command message being configured cause the other device to perform vicariously a downloading or uploading of the information or content on behalf of the mobile device.

18 Claims, 4 Drawing Sheets

(56) References Cited

U.S. PATENT DOCUMENTS

| | | | | |
|---|---|---|---|---|
| 9,042,343 | B2* | 5/2015 | Lappetelainen | H04W 48/18 370/331 |
| 9,223,529 | B1* | 12/2015 | Khafizova | G06F 3/1204 |
| 9,386,098 | B2* | 7/2016 | Reed | H04L 67/1097 |
| 2002/0161767 | A1* | 10/2002 | Shapiro | G06F 17/3089 707/999.009 |
| 2006/0135127 | A1* | 6/2006 | Aarnio | H04H 60/14 455/412.1 |
| 2006/0264197 | A1 | 11/2006 | Mahini et al. | |
| 2007/0028236 | A1 | 2/2007 | Williams, II | |
| 2007/0032225 | A1 | 2/2007 | Konicek | |
| 2007/0055660 | A1 | 3/2007 | Anderson | |
| 2007/0168966 | A1 | 7/2007 | Pessolano et al. | |
| 2009/0234967 | A1 | 9/2009 | Yu et al. | |
| 2009/0248839 | A1 | 10/2009 | Blue et al. | |
| 2010/0005527 | A1* | 1/2010 | Jeon | G06F 17/3089 726/22 |
| 2010/0081440 | A1* | 4/2010 | Reddy | H04W 88/02 455/450 |
| 2011/0247086 | A1* | 10/2011 | Ohno | G06F 21/10 726/31 |
| 2012/0151067 | A1* | 6/2012 | Piccinini | H04W 4/023 709/227 |
| 2012/0155348 | A1* | 6/2012 | Jacobson | H04L 12/10 370/311 |

OTHER PUBLICATIONS

"Foreign Office Action", CN Application No. 201280021085.0, Feb. 25, 2016, 10 pages.

"Foreign Office Action", KR Application No. 10-2013-7028091, Mar. 22, 2016, 6 Pages.

Patent Cooperation Treaty, "PCT Search Report and Written Opinion of the International Searching Authority" for International Application No. PCT/US2012/033197, Mar. 26, 2013, 9 pages.

* cited by examiner

METHOD AND SYSTEM FOR VICARIOUS DOWNLOADING OR UPLOADING OF INFORMATION

FIELD OF THE INVENTION

The present invention relates to mobile devices and, more particularly, to methods and systems allowing for receipt (or downloading) of information/signals from other locations or devices for use by mobile devices, and/or transmission (or uploading) of information/signals available at mobile devices for use at other locations or devices.

BACKGROUND OF THE INVENTION

Mobile devices such as cell phones, personal digital assistants (PDAs), and smart phones are ubiquitous and used for a variety of purposes. By virtue of communication with other locations or devices, mobile devices are able to access or download a variety of types of information including for example voice data, photographic information, and video information. Likewise, such mobile devices are also able to communicate or upload such types of information to other devices or locations. As the processing and other capabilities of mobile devices continue to increase, the amounts of information to be received and/or transmitted by such mobile devices continues to increase.

Notwithstanding ongoing improvements in the capabilities of mobile devices to communicate, store, and process large quantities of information, there nevertheless remain circumstances where a mobile device is unable to receive, download, transmit, and/or upload portions of information (or at least large amounts of information), or circumstances in which it is otherwise inappropriate for a mobile device to receive, download, transmit and/or upload portions of information (or at least large amounts of information). For example, in some circumstances a mobile device is unable to maintain adequate connectivity with wireless transceivers (e.g., cellular towers or access points) to allow for successful reception or transmission of information, or to allow for successful reception or transmission of large amounts of information. Also for example, in some circumstances the mobile device does not have sufficient power (e.g., because a battery of the mobile device is running low) to accomplished desired reception or transmission of information. Further for example, the mobile device can have limited available memory space at a time when the large amount of information is to be received by the mobile device, such that the mobile device's memory space is not sufficient at that time to store all of that information upon its being received.

It would therefore be advantageous if an improved method or system, for use or implementation on or in relation to mobile devices, could be developed that allowed for mobile devices to overcome one or more shortcomings such as one or more of those mentioned above.

SUMMARY OF THE INVENTION

In at least one embodiment, the present invention relates to a method of communicating information or content to or from a mobile device in relation to an external device by way of the internet. The method includes determining at the mobile device that the information or content should be downloaded from or uploaded to the external device, the information or content being stored upon the mobile device if it is determined that the information or content should be uploaded. The method also includes additionally determining at the mobile device that a downloading operation or an uploading operation should be offloaded to an associated device. The method further includes sending, from the mobile device for receipt by the associated device, a command message configured to cause the associated device to perform the downloading operation or the uploading operation, and receiving a confirmation message back from the associated device that the downloading operation or the uploading operation has or have been performed. If the confirmation message indicates that the associated device has performed the downloading operation, the information or content is subsequently received at the mobile device.

Further, in at least one additional embodiment, the present invention relates to a method of downloading information or content to a mobile device from an external device by way of the internet. The method includes taking at least one action at the mobile device as a result of which a relationship is established between the mobile device and another device, and first determining at the mobile device that a downloading operation by which the information or content is downloaded from the external device should be vicariously performed by the other device. The method also includes sending, from the mobile device for receipt by the other device, a command message configured to cause the other device to perform the downloading operation, receiving a confirmation message back from the other device that the downloading operation has been performed such that the information or content has been downloaded from the external device to the other device, and second determining that it is appropriate for the information or content to be provided from the other device to the mobile device. The method further includes sending a request for receipt by the other device that the information or content be provided to the mobile device, and receiving the information or content at the mobile device.

Additionally, in at least one further embodiment, the present invention relates to a mobile device. The mobile device includes a memory device that is capable of storing information or content, and at least one wireless communication component by which the mobile device is able to transmit and receive wireless communication signals. The mobile device further includes a processing device coupled at least indirectly to the memory device and to the at least one wireless communication component, and a power source. The processing device is configured to determine at least one characteristic or condition pertaining to a manner of usage of the mobile device, to a wireless connectivity status of the mobile device, or to one or more of the memory device, the at least one wireless communication component, the processing device, or the power source. Also, the mobile device is configured to send a command message to another device when the at least one characteristic or condition is determined, the command message being configured cause the other device to perform vicariously a downloading or uploading of the information or content on behalf of the mobile device.

BRIEF DESCRIPTION OF THE DRAWINGS

FIG. 3, represented by FIGS. 3A and 3B, is a flow chart showing various example steps of operation of the communications system of FIG. 1, which particularly are performed by the mobile device and the associated device of that communications system.

DETAILED DESCRIPTION

Figure 1:
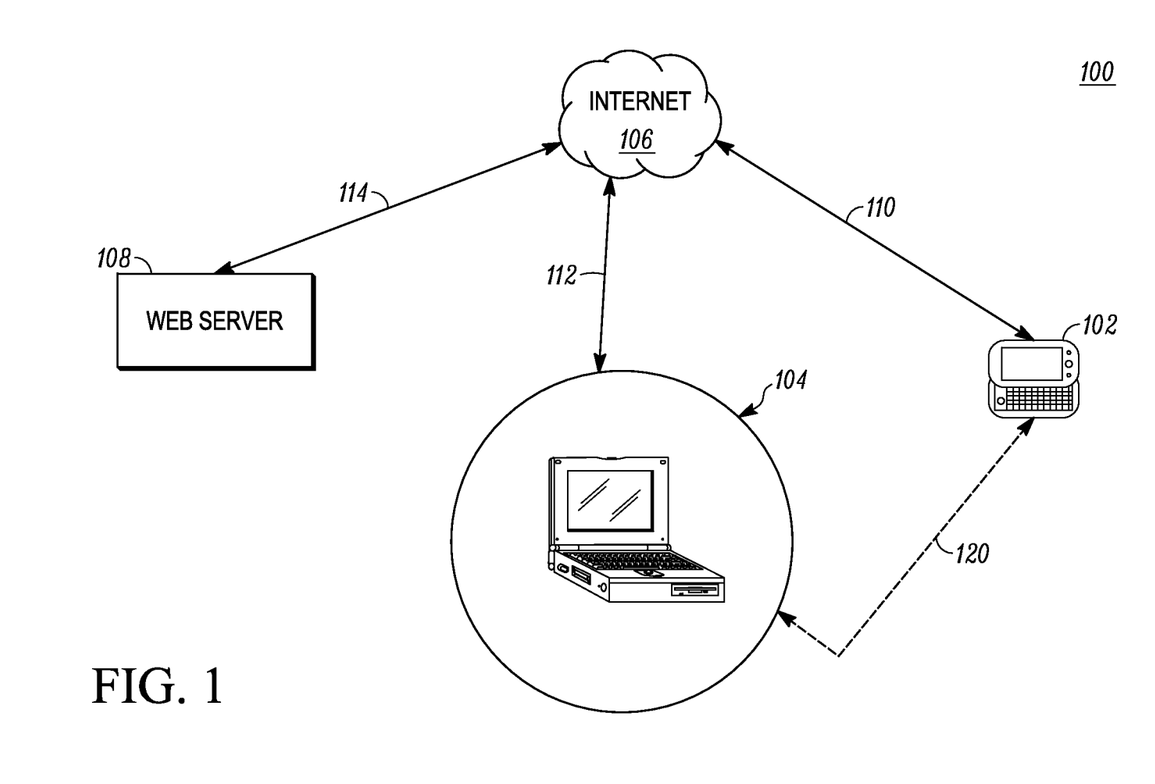
FIG. 1 shows an example communications system including a mobile device and an associated device in communication with one another and with at least one web server.

Referring to FIG. 1, a block diagram of an example communications system 100 is shown in a simplified schematic form. As shown, the communications system 100 includes a mobile device 102 and an associated device 104. The associated device 104 is referred to as "associated" device herein because, as discussed further below, a relationship between the mobile device 102 and the associated device is established such that the associated device in at least some circumstances vicariously acts on behalf of the mobile device to perform one or more operations relating to the downloading/receiving or uploading/transmitting of information. Additionally as shown, both the mobile device 102 and the associated device 104 is capable of communicating with the internet 106. By way of the internet 106, each of the mobile device 102 and the associated device 104 is also capable of indirectly communicating with a web server 108. While only the web server 108 is shown in FIG. 1, it should be understood that the web server is actually representative of the existence of many web servers that are in communication with other devices via the internet 106.

More particularly, the mobile device 102 is shown to be connected to the internet 106 by way of a wireless communication link 110, which is intended for example to be representative of wireless connection(s) between the mobile device 102 and one or more hardware devices (e.g., cellular towers or access points) that are themselves internet-connected. Further, the associated device 104 is shown to be connected to the internet 106 by a communication link 112, and the web server 108 is shown to be connected to the internet 106 by way of a further communication link 114. Each of the communication links 112, 114 can involve one or both of wireless or wired connections (for example, landline connections such as fiber optic or copper wiring connections, microwave communications, radio channel communications, and/or wireless path communications) depending upon the embodiment or device that is involved.

The internet 106 in turn can be understood to include any number of internet, intranet, and/or World Wide Web communication pathways, which themselves can employ numerous intermediary hardware and/or software devices including, for example, numerous routers, etc. A variety of communication protocols and methodologies can be used to conduct the communications over the internet 106 including, for example, the transmission control protocol/internet protocol (TCP/IP), extensible messaging and presence protocol (XMPP), file transfer protocol (FTP), etc. Although the communication links 110, 112, 114 are shown in FIG. 1 as being components of the communications system 100 that are distinct from the internet 106, these communication links can also themselves be considered to constitute part of the internet 106 as broadly understood.

Still referring to FIG. 1, the mobile device 102 is intended to be representative of any of a variety of wireless communication devices operated by persons (or users) or possibly by other entities (e.g., other computers) desiring or requiring communication capabilities. In some embodiments, for example, the mobile device 102 can be any of a cellular telephone, a personal digital assistant (PDAs), a smart phone, another handheld or portable electronic device, a headset, a MP3 player, a battery-powered device, a wearable device, a radio, a navigation device, a laptop or notebook computer, a netbook, a pager, a PMP (personal media player), a DVR (digital video recorder), a gaming device, a camera, a netbook, an e-reader, an e-book, a tablet device, a navigation device with a video capable screen, a multimedia docking station, or another mobile device.

By comparison, the associated device 104 in FIG. 1 is particularly shown in FIG. 1 to be a laptop computer as can be used in a home or office setting. The laptop computer can itself also be a mobile device as discussed above, and thus is intended to illustrate that the associated device 104 can in at least some embodiments be a mobile device that is distinct from (albeit associated with, in a manner as described further below) the mobile device 102. Although in the present embodiment the associated device 104 includes the single laptop computer, it is envisioned that in other embodiments the associated device can take other forms and/or can encompass more than one associated device rather than only a single associated device. For example, rather than being a laptop computer, the associated device 104 can be another type of mobile device such as a tablet device, an e-book, or any of the other devices identified above as potentially constituting the mobile device 102. Also, in other embodiments, the associated device can be a device that is not a mobile device, such as a desktop computer. Further, it should also be appreciated that, in other embodiments, such one or more associated devices can, instead of or in addition to including a laptop computer, include any of a variety of other types of computers (e.g., desktop computers) or other computerized devices that are capable of interacting with the internet 106 (and indirectly interacting with devices or entities in communication therewith, such as the web server 108). Again, depending upon the embodiment, such associated device(s) can include either one or more mobile devices, or one or more devices that are not mobile devices, or both.

Additionally, the web server 108 is intended be representative of a server that supports internet protocols or otherwise is capable of interaction with the internet or World Wide Web. That said, the web server 108 is also intended to be representative of any computerized device or terminal (or several of these) with which the mobile device 102 and the associated device 104 are capable of communicating, for the purpose of receiving/downloading or transmitting/uploading information, via the internet 106. Although only the single web server 108 is shown in FIG. 1, it should be appreciated that FIG. 1 is intended to be representative of numerous alternate embodiments of communications systems and arrangements in which a mobile device such as the mobile device 102 and one or more other devices such as the associated device 104 are capable of communicating, via one or more internet-type connections, with any one or more web servers and/or any one or more devices other than web servers, for the purpose of downloading/receiving or transmitting/uploading any of a variety of types of information or content.

Assuming that as shown in FIG. 1 the mobile device 102 and the associated device 104 are in communication with a web server such as the web server 108 of FIG. 1, it should be further appreciated that the web server can take a variety of different forms depending upon the embodiment. In at least some embodiments, for example, the web server 108 is a content provider website (CPW), which can be understood to generally encompass any of a variety of types of websites including, for example, social networking websites (SNWs), business-to-business websites, business-to-consumer websites, news feeds, video broadcast or other broadcast sources, music and photograph websites, or other sources of media content. Further for example, such a CPW can include Facebook™, MySpace™, hi5™, LinkedIn™, and Twitter™, youtube.com, hulu.com, as well as sources of RSS or other news feeds, photograph services such as Picasa™ or Photobucket™, and music services such as LastFMT™.

The type(s) of information or content that can be downloaded/received from or uploaded/transmitted to a web server such as the web server 108 (and/or other device(s) or component(s) with which the mobile device 102 and the associated device 104 are in communication, depending upon the embodiment) can also vary considerably depending upon the embodiment or circumstance. Assuming that the web server 108 is a CPW as mentioned above, for example, the information or content that can be downloaded/received from, or uploaded/transmitted to, such a CPW can include, among other things, file information (e.g., photos, music, videos, text entries, etc.), blog postings, and messaging (e.g., Short Message Service (SMS), Multimedia Messaging Service (MMS), and Instant Messaging (IM) messages), as well as possibly streaming video and/or audio information. Additionally for example, in some embodiments the web server 108 can be the source of one or more software update(s), and the information or content received by the mobile device 102 and the associated device 104 can include software update content.

Finally, still referring to FIG. 1, in addition to the communication links 110, 112, and 114 and the internet 106 discussed above, an additional communication link 120 is shown to exist either continuously or at least temporarily or intermittently (as represented by the dashing of the communication link as shown in FIG. 1) between the mobile device 102 and the associated device 104. Although the additional communication link 120 as shown in FIG. 1 is shown as only a single communication link, it should be understood that the number of communication links can vary depending upon the embodiment and, among other things, upon whether the mobile device 102 is in communication with more than one associated device rather than just the associated device 104 as shown in FIG. 1. That is, in general, the number of additional communication links such as the additional communication link 120 can correspond to the number of computer systems or other devices encompassed within the associated devices such as the associate device 104, as can vary depending upon the embodiment.

Although not necessarily the case in all embodiments, in one embodiment the additional communication link 120 particularly includes a Bluetooth wireless communication link established between the mobile device 102 and the associated device 104. That said, in other embodiments, the additional communication link (or communication links, if several are present) 120 can encompass one or more other types of wireless connections and/or wired connections instead of (or in addition to) a Bluetooth wireless communication link. For example, in another embodiment, the additional communication link 120 is a wired communication link including a dedicated connecting cord or cords, such as for example a universal serial bus (USB) cable (and any associated connectors). Depending upon the embodiment, the wireless and/or wired connections can be, but need not be, secure (or substantially secure). That said, in one embodiment in which the additional communication link 120 involves a Bluetooth connection, the Bluetooth connection is particularly intended to be a dedicated, secure (or substantially secure) connection between these particular communication system components. That is, in such embodiment, the mobile device 102 and the associated device 104 have a special relationship characterized by a dedicated, secure (or substantially secure) connection. Further it should be noted that, although the additional communication link 120 is shown to be independent of the internet 106 in FIG. 1, it is possible in alternate embodiments that the additional communication link will also involve the internet 106 such that communications between the mobile device 102 and the associated device 104 proceed at least in part by way of the internet.

Regardless of the type(s) of connection(s) involved in providing the additional communication link 120 or whether the additional communication link 120 involves internet connectivity or not, the additional communication link 120 is intended to signify that, in accordance with the present embodiment, there exists a relationship between the mobile device 102 and the associated device 104 according to which those communications system components communicate particularly with one another in manner(s) such as described further below, so as to allow for or facilitate the downloading/receipt of information or content from the web server 108 (or other web servers or other devices on the internet 106) and/or the uploading/transmission of information or content to the web server 108 (or other web servers/devices on the internet) in circumstances where it might not be appropriate or possible for the mobile device 102 to download/receive or upload/transmit such information or content by itself. That is, as described further below, the associated device 104 cooperates with the mobile device 102 under various circumstances to act vicariously, in place of the mobile device, to conduct downloading/receipt and/or uploading/transmission operations when the mobile device 102 is not under those circumstances able to do so itself or all by itself.

Figure 2:
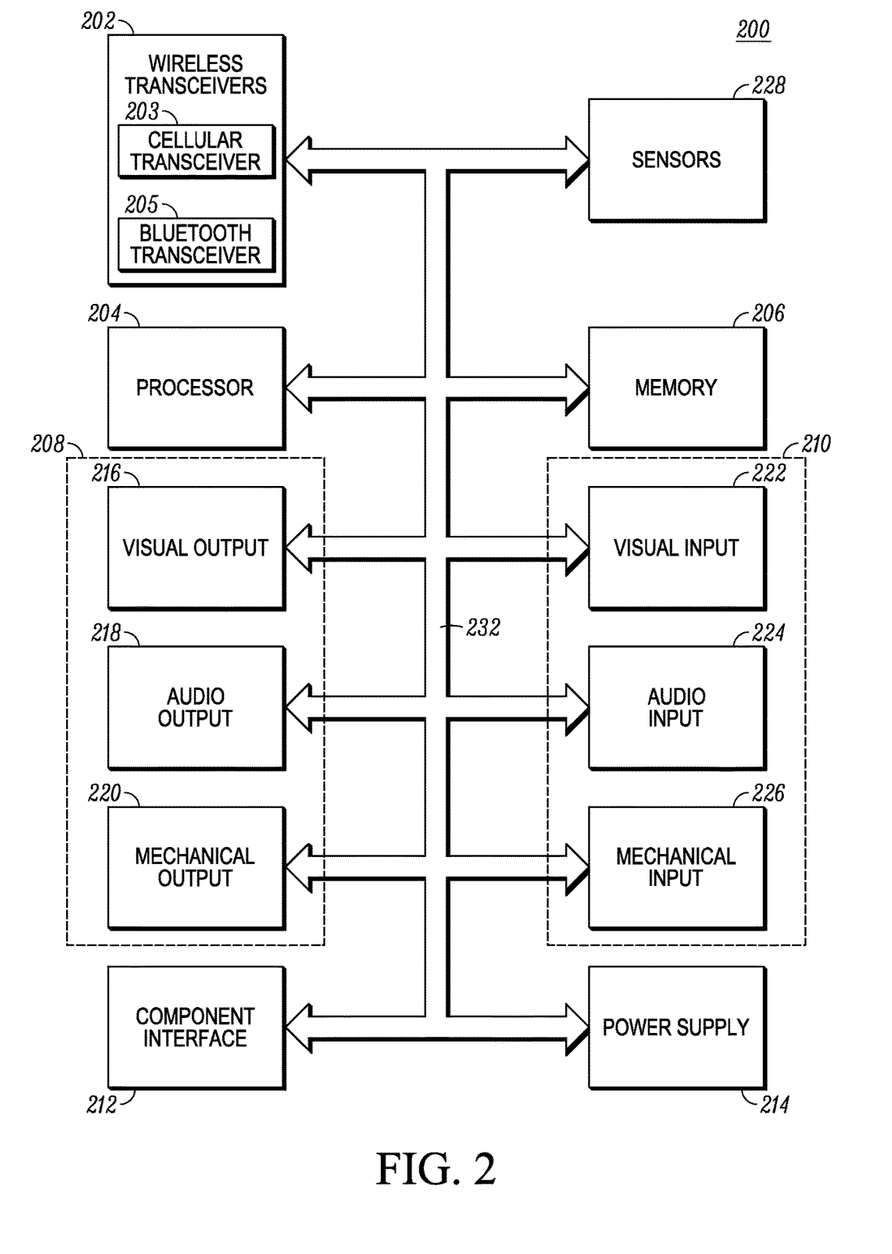
FIG. 2 is a block diagram showing example internal hardware components of the mobile device of FIG. 1.

Referring to FIG. 2, there is provided a block diagram illustrating example internal hardware components 200 of the mobile device 102 of FIG. 1, in accordance with the present embodiment. As shown in FIG. 2, the internal components 200 include one or more wireless transceivers 202, a processor portion 204 (e.g., one or more of microprocessor(s), microcomputer(s), application-specific integrated circuit(s), etc.), a memory portion 206, one or more output devices 208, and one or more input devices 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 102 to be portable. Further, the internal components 200 additionally include one or more sensors 228. All of the internal components 200 can be coupled to one another, and in communication with one another, by way of one or more internal communication links 232 (e.g., an internal bus).

Each of the wireless transceivers 202 utilizes a wireless technology for communication, which can include for example (but are not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth or IEEE 802.11(a, b, g or n), or other wireless communication technologies such as infrared technology. In the present embodiment, the wireless transceivers 202 include a cellular transceiver 203 and a Bluetooth transceiver 205, although in other embodiments only one of these types of wireless transceivers (and possibly neither of these types of wireless transceivers, and/or additional types of wireless transceivers) is present. It should be understood that, while the present embodiment includes the wireless transceivers 202, each of which can be understood to include both a wireless receiver and a wireless transmitter, in other embodiments the receiver and transmitter for any given type of wireless technology can be distinct components, and/or a receiver for a given type of wireless technology can be present even though a transmitter for that wireless technology is not present, or vice-versa (a transmitter is present while a receiver is not).

By virtue of the use of the wireless transceivers 202, the mobile device 102 is capable of communicating with a variety of external components such as cell towers, access points/hotspots, and other devices, including the associated device 104 (or multiple such associated devices if more than one are involved). It is particularly envisioned that, in the present embodiment, the cellular transceiver 203 allows for the mobile device 102 to engage in communications via the communication link 110 with the internet 106 (and ultimately thereby engage in communications with the web server 108), while the Bluetooth transceiver 205 allows the mobile device 102 to engage in communications via the additional communication link 120 with the associated device 104.

Operation of the wireless transceivers 202 in conjunction with others of the internal components 200 of the mobile device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor portion 204 formats the incoming information for the one or more output devices 208. Likewise, for transmission of wireless signals, the processor portion 204 formats outgoing information, which can but need not be activated by the input devices 210, and conveys the outgoing information to one or more of the wireless transceivers 202 for modulation so as to provide modulated communication signals to be transmitted. The wireless transceivers 202 convey the modulated communication signals by way of wireless or wired communication links such as (as already discussed) the communication links 110, 120 for receipt by other devices such as cell towers or access point/hotspots (e.g., for communications via the internet 106) or the associated device 104.

Depending upon the embodiment, the input and output devices 210, 208 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone, and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

Additionally, while in FIG. 2 the input devices 210 are shown to be distinct from the output devices 208, it should be recognized that in some embodiments one or more devices serve both as input device(s) and output device(s). For example, in some embodiments the mobile device 102 can include a touchscreen display having a user interface that comprises both one or more of the visual output devices 216, insofar as the touchscreen display outputs images, as well as one or more of the mechanical input devices 226, insofar as user touch inputs are sensed by the touchscreen display. In other embodiments, other types of devices can be used that should be considered both among the input devices 210 and the output devices 208.

As mentioned above, the internal components 200 also can include one or more of various types of sensors 228. The sensors 228 can include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface of the mobile device 102. While the sensors 228 for the purposes of FIG. 2 are considered to be distinct from the input devices 210, in other embodiments it is possible that one or more of the input devices can also be considered to constitute one or more of the sensors (and vice-versa).

The memory portion 206 of the internal components 200 can encompass one or more memory devices of any of a variety of forms (e.g., read-only memory, random access memory, static random access memory, dynamic random access memory, etc.), and can be used by the processor portion 204 to store and retrieve data. In some embodiments, the memory portion 206 (or a portion thereof) can be integrated with the processor portion 204 (or a portion thereof) in a single device (e.g., a processing device including memory or processor-in-memory (PIM)), albeit such a single device will still typically have distinct portions/sections that perform the different processing and memory functions and that can be considered separate devices.

The data that is stored by the memory portion 206 can include, but need not be limited to, operating systems, programs (applications), and informational data. Each operating system includes executable code that controls basic functions of the mobile device 102, such as interaction among the various components included among the internal components 200, communication with external devices via the wireless transceivers 202 and/or the component interface 212, and storage and retrieval of programs and data, to and from the memory portion 206. By contrast, each program includes executable code that utilizes an operating system to provide more specific functionality, such as file system service and handling of protected and unprotected data stored in the memory portion 206. Although many such programs govern standard or required functionality of the mobile device 102, in many cases the programs include applications (or simply "apps") governing optional or specialized functionality, which can be provided in some cases by third party vendors unrelated to the mobile device manufacturer.

Finally, with respect to informational data, this is non-executable code or information that can be referenced and/or manipulated by an operating system or program for performing functions of the mobile device 102. Such informational data can include portions of the information or content described above that is downloaded/received from, or uploaded/transmitted to, the web server 108 (or other server(s), device(s) or component(s)) via the internet 106), during ongoing operation of the mobile device 102. Such informational data can also include data that is preprogrammed upon the mobile device 102 during manufacture. Notwithstanding the above, however, it should further be appreciated that the "information or content" described above as being uploaded/transmitted from or downloaded/received by the mobile device 102 and/or the associated device 104 should be broadly understood to encompass not merely "informational data" as is being described here with respect to the memory portion 206, but also to encompass programs, apps, software updates, and operating system code as well—that is, to encompass any and all information or content, of any type, that is potentially uploaded/transmitted from or downloaded/received by the mobile device 102.

Although FIG. 2 particularly shows the internal components 200 of the mobile device 102 of FIG. 1, it should be understood that some (and potentially all) of these internal components can also be present in the associated device 104 of FIG. 1 (or, in alternate embodiments, in any other computer system or device that is in communication both with the internet 106 and with a mobile device such as the mobile device 102). Indeed, the laptop computer constituting the associated device 104 of FIG. 1 can include processor and memory portions, input and output devices, component interfaces, power supplies, and sensors (e.g., cameras) as are included with the mobile device 102. Further, since the laptop computer constituting the associated device 104 is a mobile device, the laptop computer also can be understood to include wireless transceivers as are included with the mobile device 102. Thus, in addition to being a representation of the internal components 200 of the mobile device 102 of FIG. 1, FIG. 2 can also be considered to be equally or substantially equally representative of the internal components of one or more associated devices such as the associated device 104 that have a relationship with the mobile device 102.

Figures 3, 3A:
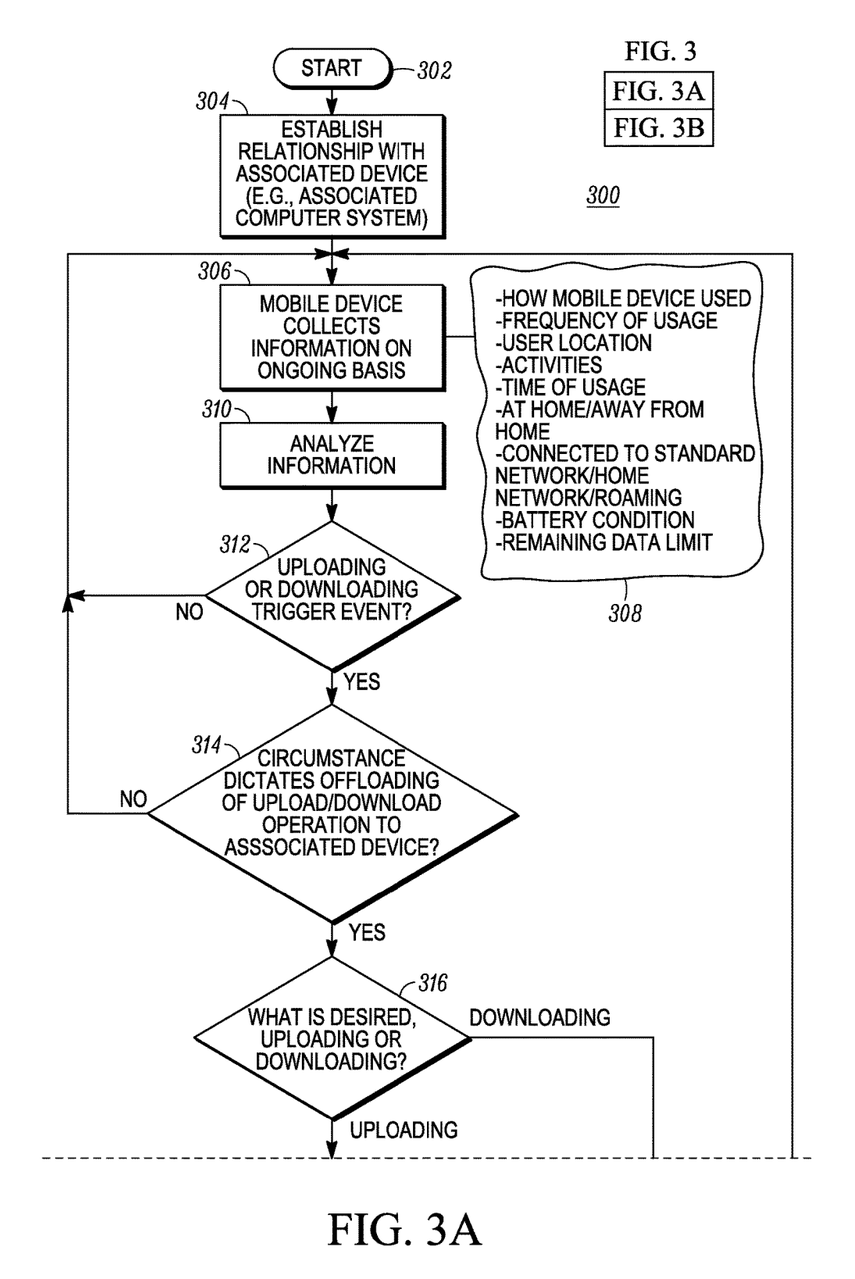
Figure 3B:
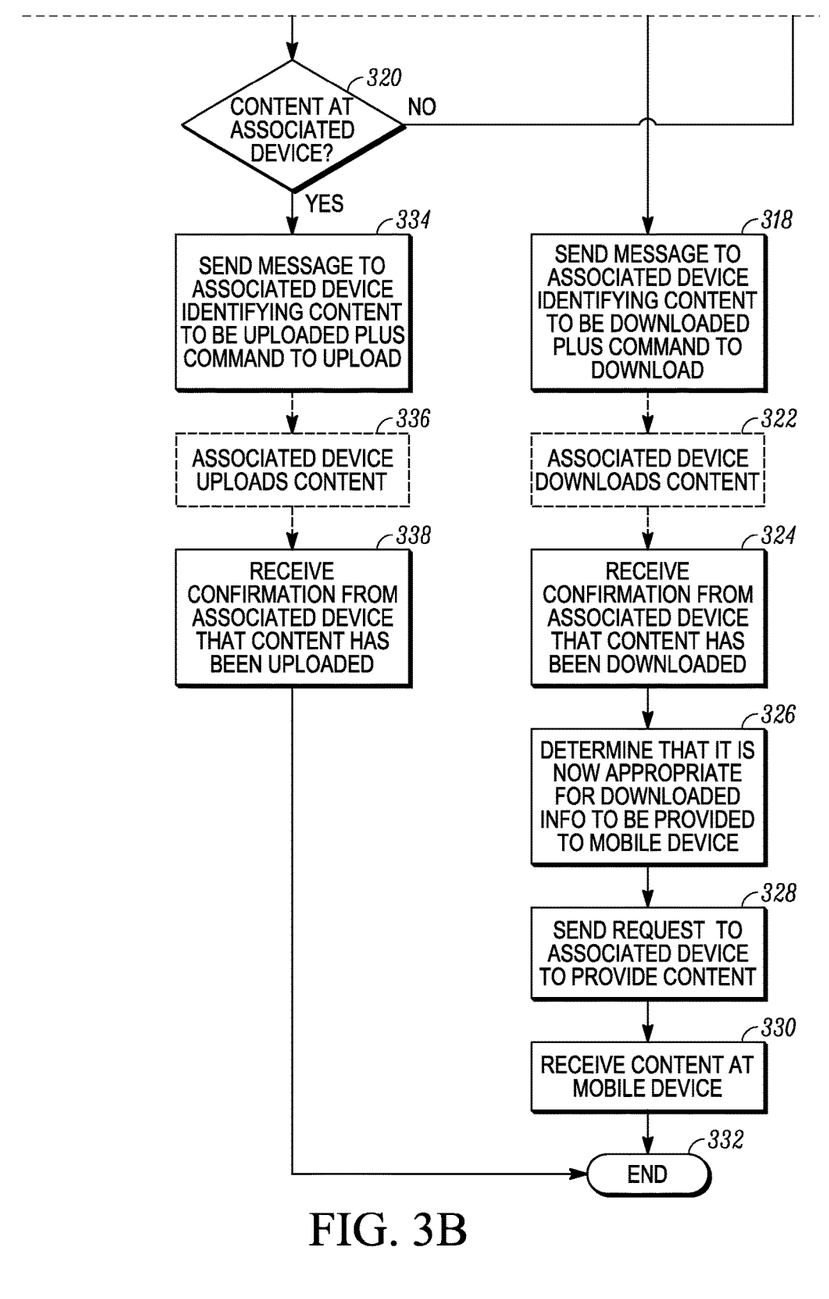

Turning to FIG. 3, represented by FIGS. 3A and 3B, a flow chart 300 shows example steps of operation of the mobile device 102 in relation to the other components of the system 100 of FIG. 1. As shown, upon commencing operation at a step 302, the mobile device 102 establishes a relationship with the associated device 104 at a step 304 (it is by virtue of establishment of this relationship that the associated device 104 can be considered "associated" with the mobile device). The establishing of the relationship of the step 304 can be performed by the mobile device 102 automatically or in response to one or more operator commands, for example, a command from an operator entered at the mobile device in which the operator selects the associated device 104 from among a listing of several possible devices.

As described in further detail below, in accordance with the relationship established between the associated device 104 and the mobile device 102, the associated device 104 in one or more circumstances acts vicariously, in place of the mobile device, to conduct downloading/receipt and/or uploading/transmission operations when the mobile device 102 is not under those circumstances able to do so itself or all by itself. In the present embodiment, the relationship between the mobile device 102 and the associated device 104 is a dedicated relationship in which it is only the associated device 104 that can act vicariously on behalf of the mobile device 102 with respect to the downloading/receipt and/or uploading/transmission of information (and not any other devices). Nevertheless, in other embodiments or implementations one or more other relationships can be established between the mobile device 102 and a variety of one or more associated devices (potentially including or not including the particular associated device 104 of FIG. 1). In such other embodiments, the mobile device 102 can utilize more than one associated device for vicariously conducting downloading/receipt and/or uploading/transmission operations depending upon the circumstances or other conditions.

Assuming that such a relationship between the mobile device 102 and the associated device 104 (or, in other embodiments, another device or device(s)) has been established at the step 304, next at a step 306 the mobile device 102 collects information on an on-going basis regarding any one or more of a variety of characteristics or events that are experienced by the mobile device in terms of its operations or its interactions with users, devices or other entities. For example, as shown in a listing 308, the mobile device 102 can monitor and collect information regarding how the mobile device is being used, such as information regarding the frequency of usage or the types of activities that the mobile device 102 is performing during such usage or the times of usage. Further for example, the mobile device can monitor the location of the mobile device, in absolute terms or relative to some reference point (and/or monitor the location of the user with whom the mobile device is associated). Also for example, the mobile device 102 in some embodiments or circumstances can monitor or sense an activity of a user with whom the mobile device is associated, for example, an activity such as driving, cycling, jogging, or running. Such activity can be detected in a variety of manners depending upon the embodiment and, for example, can be detected by sensing particular movements of the mobile device that suggest that such activity is taking place, or based upon information input into the mobile device from a user.

Additionally for example, the mobile device 102 can monitor whether it is being used at home or away from home, or whether it is connected to a home network or a standard network (e.g., a cellular network or Wi-Fi network) or is merely roaming. Further for example, the mobile device 102 can monitor the battery condition of the mobile device, or a remaining data limit (e.g., the amount of data that can be uploaded/downloaded in accordance with a data plan for the mobile device, such as a data plan pertaining to internet access by the mobile device). The characteristics/conditions shown in the listing 308 are only intended to be examples, and a variety of other types of information can be monitored and collected by the mobile device 102 in addition to, or instead of, the conditions shown in the listing 308.

Next, at a step 310, the mobile device 102 analyzes the information that has been collected, for example by way of the processor portion 204 of the mobile device. The manner of analysis and amount of analysis that is conducted can vary depending upon the embodiment and/or the type(s) of information that are being analyzed. Although the analysis step 310 is shown to be sequentially following the step 306 involving the collection of information, it should be understood that such analysis and collection of information can both be ongoing processes that are occurring simultaneously and/or in a continuous, substantially continuous, or repetitive manner.

Additionally, at some point following the step 310 (and/or while the step 310 and/or the step 306 are being performed in an ongoing manner), the mobile device 102 can detect whether a trigger event has occurred that would trigger the mobile device 102 to determine that downloading/receipt or uploading/transmission of information or content with respect to the internet 106 (and/or with respect to entities such as the web server 108 connected thereto) should be performed, as represented by a step 312. A trigger event can include, for example, the receiving of a user command at the mobile device 102 that expressly or implicitly requires that one or more downloading/receipt or uploading/transmission operations be performed including, for example, a user command by which the user selects or "clicks" on a selectable hyperlink, icon, or button shown on the mobile device 102. It should be appreciated the detecting of the trigger event at the step 312, as well as other detecting and/or determining operations discussed herein, can particularly be performed at the mobile device 102 by way of the processor portion 204 of the mobile device.

So long as no trigger event occurs as determined at the step 312, the process continues to perform the steps 306 and 310 on an ongoing or repetitive basis. However, if a trigger event is determined to have occurred at the step 312, then the process advances to a step 314, at which the mobile device 102 further determines whether in the present circumstances it is appropriate to offload the downloading/receiving or uploading/transmission of information or content to the associated device 104 with respect to which the mobile device 102 established a relationship at the step 304 (or, if there are multiple associated devices, whether it is appropriate to offload such operations to one or more of those multiple associated devices). In the present embodiment, the determination is made based upon the collected information obtained at the step 306 (as analyzed or processed at the step 310). Thus, the determination at the step 314 can be made based upon any one or more of a variety of historical or current information relating to operational conditions, characteristics, or contexts. Also, in some embodiments, the determination at the step 314 can also or instead take into account one or more user input commands.

For example, the offloading of a downloading or uploading operation from the mobile device 102 to the associated device 104 can be appropriate if the mobile device 102 is currently accessing a third party website supported by the web server 108 and a request has been entered by the user to download information or content available at that website or to upload information or content to that website, but the power supply 214 (e.g., the battery) of the mobile device 102 is low on stored energy or otherwise is unable to supply sufficient or desired levels of power to the mobile device (e.g., to operate the wireless transceivers 202) to achieve the desired downloading or uploading operation(s). Also, the offloading of a downloading or uploading operation can be appropriate if the connectivity between the mobile device 102 is insufficiently reliable or is too slow to allow for efficient downloading or uploading of the information or content of interest.

Further for example, the offloading of a downloading operation from the mobile device 102 to the associated device 104 can be appropriate if the memory portion 206 is storing other information or content such that there is not enough remaining memory available for storing of the information or content to be downloaded, or if for some other reason the mobile device 102 is not ready to handle such large amounts of information or content (e.g., because the processor portion 204 is not ready to be tasked with processing such information or content even though the memory portion may be ready to receive such information or content). A number of these circumstances can particularly become of concern when the amount of information or content to be downloaded or uploaded is large. Additionally, as already noted, whether the downloading or uploading information should be offloaded to or vicariously performed by the associated device 104 can be determined based upon whether a user input command to do so has been received by the mobile device 102.

If at the step 314 it is determined that no circumstance presently dictates that one or more downloading/receiving or uploading/transmission operations should be offloaded to the associated device 104, then the process returns to the step 306. As part of the return to the step 306, it can be understood that in this circumstance the mobile device 102 can itself perform any downloading/receiving or uploading/ transmission operations that should be performed at this time in response to the trigger event detected at the step 312. However, if at the step 314 it is determined that the downloading or uploading should be offloaded to the associated device 104, then the process instead advances to a step 316. At the step 316, it is determined whether it is particularly downloading/receiving of information or content or uploading/transmission of information or content that is desired. Although this determination is shown in FIG. 3 to be a step distinct from the steps 310-314, this determination can also be made at (as part of) one or more of those steps. Regardless, step 316 is shown to be separate from the steps 310-314 because the process represented by the flow chart 300 takes different paths following step 316 depending upon whether it is downloading or uploading that is to be performed. More particularly, if downloading/receiving of information or content is desired, then the process proceeds from the step 316 to a step 318 and to additional subsequent steps 322-330 prior to ending at an end step 332, but if uploading/ transmission of information or content is desired, then the process proceeds from the step 316 to a step 320 and then to further steps 334-338 prior to ending at the end step 332.

If downloading/receiving of information or content is desired and the process proceeds from the step 316 to the step 318, then at the step 318 the mobile device 102 sends a message to the associated device 104 identifying the information or content that is to be downloaded, along with a command that the associated device 104 perform the downloading/receiving. Depending upon the embodiment, this message can also include supplemental information, for example, a location at which the information or content to be downloaded can be found (e.g., the web address of a web page of a website hosted by the web server 108 at which the information or content is accessible).

Upon the message being sent at the step 318, then next at a step 322 the associated device 104 vicariously (that is, instead of and/or on behalf of the mobile device 102) performs the requested downloading/receiving operation. This step is shown in dashed lines since, in contrast to all of the other steps of the flow chart 300, which are performed by the mobile device 102 (aside from a step 336 to be discussed below), the step 322 is performed by the associated device 104. The step 322 particularly is shown for convenience, to make clear that it is the associated device 104 that actually performs the downloading of information or content in this example circumstance. The downloading operation performed by the associated device 104 can particularly be performed via communications of the associated device via the communication link 112 and the internet 106 in relation to one or more sources of the information or content to be downloaded, for example, the web server 108 (such communications with the web server 108 in particular will also involve the communication link 114). Upon completion of the step 322, then at a step 324 the mobile device 102 receives a confirmation from the associated device 104 that the information or content to be downloaded/received has in fact been downloaded/received at the associated device.

As already discussed, it is at the step 314 that the mobile device 102 determined that the downloading/receiving of information or content should be offloaded to the associated device 104 such that, at the step 322, such downloading/receiving is performed by the associated device 104. Nevertheless, at some subsequent time, the one or more circumstances can change such that at that subsequent time it is appropriate for the information or content that was downloaded by the associated device 104 to be provided to the mobile device 102. Such a determination of whether circumstances have changed sufficiently is made at a step 326, and the determination can be made by the mobile device 102 by itself based upon its own information (e.g., independently), or by the mobile device 102 based upon one or more communications it has had or is having with the associated device 104 and/or with other device(s), depending upon the embodiment or operational circumstance. In at least some embodiments in which the steps 306 and 308 involving the collection and analysis of information are performed on an ongoing basis (as mentioned above), the determination made at the step 326 can be made based upon new or real-time information as collected and analyzed by virtue of these operations.

That said, the basis for the determination made at the step 326 can vary significantly depending upon the embodiment or circumstance, and often will have some correspondence to the basis upon which the mobile device 102 determined at the step 314 that offloading of the downloading operation was appropriate. For example, suppose that the mobile device 102 determines at the step 314 that offloading of the downloading operation is appropriate because the battery power is low (or because of some other concern about the power supply 214 operation). In such circumstance, the mobile device 102 can subsequently determine at the step 326 that it is appropriate for the information or content downloaded by the associated device 104 to be provided to the mobile device 102 if and when the mobile device detects that the battery has now been replaced or recharged.

Also for example, suppose that the mobile device 102 determines at the step 314 that offloading of the downloading operation is appropriate because the wireless connectivity of the mobile device itself with respect to the internet 106 via the wireless communication link 110 is not sufficiently reliable to support direct communication of the information or content of interest, or because the wireless connectivity that is available is otherwise inappropriate for such communication of that information or content (for example, because of limited bandwidth or because the mobile device has a limited data plan). In such circumstance, the determination by the mobile device 102 at the step 326 can occur immediately upon the mobile device receiving the confirmation at the step 324 that the information or content has been successfully downloaded by the associated device 104, assuming that the communication link 120 is sufficiently reliable (and/or is otherwise appropriate) to allow for the downloaded information or content to be immediately provided to the mobile device from the associated device.

Additionally for example, suppose that the mobile device 102 determines at the step 314 that offloading of the downloading operation is appropriate because the mobile device did not at that time have sufficient memory available to receive the information or content to be downloaded. In such circumstance, the determination at the step 326 can occur at a later time when the mobile device 102 detects that there is at that later time sufficient memory available at the mobile device to receive that information or content. Still further for example, the determination made at the step 326 in another embodiment can be simply a determination made by the mobile device 102 that a particular amount of time has elapsed since the vicarious downloading operation by the associated device 104 has occurred (or since the confirmation message was received at the step 324), thus indicating that it is now an appropriate time for the downloaded information to be communicated from the associated device 104 to the mobile device 102.

Upon the mobile device 102 determining at the step 326 that it is appropriate for the information or content downloaded by the associated device 104 to be provided to the mobile device, then at a step 328 the mobile device provides a request to the associated device to provide the downloaded information or content to the mobile device. Subsequently in response, at a step 330, the previously-downloaded information or content is received at the mobile device 102 from the associated device 104 by way of the communication link 120 and then the process ends at an end step 332 (it being understood that the process could again be repeated by returning to the step 302).

If alternatively at the step 316 it is determined that uploading of information is desired (instead of downloading of information), rather than advancing from the step 316 to the step 318, the process instead advances from the step 316 to the step 320, at which the mobile device 102 determines whether the information or content desired for uploading is already present at the associated device 104 (and thus already available for uploading by that associated device). This can be determined in a variety of manners depending upon the embodiment or circumstance.

For example, the mobile device 102 can consult its own stored records about information/content that has been provided to the associated device 104 by the mobile device 102 (or that otherwise is known by the mobile device to be present at the other device). Also for example, the mobile device 102 can engage in communication with the associated device 104 at the time of performing the step 320 to determine if the information or content desired for uploading is available at that associated device. Further for example, the mobile device 102 can potentially consult an additional external device to determine whether the information or content desired for uploading is present at the associated device 104. In this regard, additionally for example, the mobile device 102 can consult a third party website that has information about how the information or content desired for uploading was previously transmitted to the associated device 104.

If the information or content desired for uploading is not available at the associated device 104 as determined at the step 320, then the desired uploading cannot occur and so the process reverts to the step 306. However, if the information or content desired for uploading is available at the associated device 104, then the process advances to a step 334, at which the mobile device 102 sends a message to the associated device 104 identifying the information or content with respect to which uploading is desired and also commanding that the associated device upload that information/content. This command can further specify the location (e.g., the web address of a website hosted by the web server 108) to which the information or content desired for uploading is to be uploaded/transmitted. Depending upon the embodiment, the information or content can thus be uploaded to any of a variety of locations or devices including, for example, the web server 108 (or any other server(s), device(s) or component(s) with which communications via the internet 106 are possible).

Next, at a step 336, the associated device 104 vicariously (that is, instead of and/or on behalf of the mobile device 102) uploads the information or content to the location or device commanded (e.g., to the web server 108) at the step 334. As was the case with respect to the step 322, the step 336 is shown in FIG. 3 in dashed lines because it is performed by the associated device 104 rather than the mobile device 102 (by comparison, all of the other steps shown in the flow chart 300 aside from the step 322 are performed by the mobile device). Finally, upon the uploading of the information or content by the associated device 104 being completed, then at a step 338 the mobile device 102 receives a confirmation from that associated device 104 that the commanded uploading has been completed. Upon that message being received at the mobile device 102, the process then ends at the end step 332 (albeit the process can at that point also be repeated by returning to the step 302).

Notwithstanding the above description, the present invention is not intended to be limited to the above-described embodiments but rather is intended to encompass numerous variations and alternate embodiments of processes and systems that allow for vicarious downloading or uploading of information or content, on behalf of a mobile device, by way of operations of another device or devices. For example in some other embodiments, additional steps are provided to achieve desired downloading or uploading of information or content in addition to those described above. More particularly in this regard, it will be understood that, depending upon the embodiment, the processes described above can also encompass additional complementary steps (besides the steps 322 and 336) that are performed by the associated device 104. Also, depending upon the embodiment, interactions can occur not only between the mobile device 102 and associated devices such as the associated device 104, but also between the mobile device 102 and still further other device(s). For example, uploading of information/content in one alternate embodiment can be achieved by having one other device upload one portion of that information/content and another device upload another portion (the remainder) of that information/content.

Also, notwithstanding the particular description provided above, it should be understood that one or more of the operations performed in accordance with the flow chart 300 can be modified or performed in a different order than that shown in FIG. 3 in some alternate embodiments. For example, while in FIG. 3 downloading and uploading operations are treated as distinct (separate) possible operations, in other embodiments downloading and uploading operations can be performed in combination with one another and/or at substantially the same time. Also, as already discussed with respect to some of the steps of the flow chart 300 (e.g., the steps 306, 310, 312), one or more of the operations discussed above as being performed in a particular order can, in other embodiments, be performed simultaneously or substantially simultaneously, and/or in a repetitive or ongoing manner. Also, in some alternate embodiments, multiple ones of the above-discussed operations can be merged into single operations.

Thus, it is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A method of uploading information or content, the information or content present on a mobile device, to an external device, the method comprising:
   establishing, by the mobile device, a communication connection between the mobile device and an associated device;
   collecting, by the mobile device on an ongoing basis, information regarding conditions experienced by the mobile device, the conditions experienced by the mobile device comprising mobile device usage, a data plan limit of the mobile device, or activities by a user of the mobile device;
   detecting, by the mobile device and from the information regarding the conditions experienced by the mobile device, that a trigger event has occurred at the mobile device;
   determining, by the mobile device and after the trigger event has occurred, that uploading of the information or content to the external device is to be performed by a device other than the mobile device;
   determining, by the mobile device, that the information or content present on the mobile device and for uploading to the external device is present on the associated device;
   sending, from the mobile device for receipt by the associated device, a command message configured to cause the associated device to upload the information or content, present on both the mobile device and the associated device, from the associated device to the external device; and
   receiving, by the mobile device, a message from the associated device confirming that the information or content has been uploaded from the associated device to the external device.

2. The method of claim 1 further comprising, determining, by the mobile device after receiving the message confirming the information or content has been uploaded from the associated device to the external device, that the trigger event associated with conditions being experienced by the mobile device no longer exists, such that it is appropriate for the information or content present on the mobile device to be uploaded by the mobile device to the external device.

3. The method of claim 1, wherein the conditions associated with the mobile device usage include a frequency of use of the mobile device, a geographic location of use of the mobile device, or a time of use of the mobile device.

4. The method of claim 1, wherein the determining, by the mobile device, that the uploading of the information or content to the external device is to be performed by a device other than the mobile device occurs at least in part based upon a user command received at the mobile device.

5. The method of claim 1, wherein the conditions experienced by the mobile device associated with the mobile device system usage include frequency of use of the mobile device, a geographic location of the mobile device, or a time of use of the mobile device.

6. The method of claim 1, wherein the conditions experienced by the mobile device associated with the activities by the user of the mobile device include driving, cycling, or running.

7. The method of claim 1, wherein the conditions experienced by the mobile device further comprise the mobile device system status and connectivity of the mobile device to devices other than the associated device.

8. The method of claim 7, wherein the conditions experienced by the mobile device associated with mobile device system status include a battery condition of the mobile device or a memory storage capacity status of the mobile device.

9. The method of claim 7, wherein the conditions experienced by the mobile device associated with connectivity of the mobile device to devices other than the associated device include whether the mobile device is being used at home or away from home, whether the mobile device is connected to a home network or a standard network, if there is a bandwidth limitation, or if the mobile device is roaming.

10. A method of downloading information or content to a mobile device from an external device, the method comprising:
   establishing a communication connection between the mobile device and an associated device;
   collecting, by the mobile device on an ongoing basis, information regarding conditions experienced by the mobile device, the conditions experienced by the mobile device comprising mobile device usage, a data plan limit of the mobile device, or activities by a user of the mobile device;
   detecting, by the mobile device and from the information regarding the conditions experienced by the mobile device, that a trigger event has occurred at the mobile device;
   determining, by the mobile device and after the trigger event has occurred, that receiving of the information or content for downloading from the external device is to be performed by a device other than the mobile device;
   sending, from the mobile device for receipt by the associated device, a command message configured to cause the other device to receive the information or content downloaded from the external device; and
   receiving, by the mobile device, a message from the associated device confirming that the information or content has been downloaded from the external device and received by the associated device.

11. The method of claim 10, wherein the determining, by the mobile device, that the receiving of information or content from the external device is to be performed by a device other than the mobile device occurs at least in part based upon a user command received by the mobile device.

12. The method of claim 10, wherein the conditions experienced by the mobile device associated with the mobile device system usage include frequency of use of the mobile device, a geographic location of the mobile device, or a time of use of the mobile device.

13. The method of claim 10, wherein the conditions experienced by the mobile device associated with the activities by the user of the mobile device include driving, cycling, or running.

14. The method of claim 10, wherein the conditions experienced by the mobile device further comprise the mobile device system status and connectivity of the mobile device to devices other than the associated device.

15. The method of claim 14, wherein the conditions experienced by the mobile device associated with mobile device system status include a battery condition of the mobile device or a memory storage capacity status of the mobile device.

16. The method of claim 10, further comprising:
   detecting, by the mobile device, that the trigger event associated with conditions being experienced by the mobile device no longer exists;
   sending, from the mobile device and for receipt by the associated device, a request that the information or content downloaded from the external device to the associated device be downloaded from the associated device to the mobile device; and
   receiving, by the mobile device and from the associated device, the information or content.

17. A mobile device comprising:
   a memory device that is capable of storing information or content;
   at least one wireless communication component by which the mobile device is able to transmit wireless communication signals to, and receive wireless communication signals from, an external device and an associated device;
   a power source; and
   a processing device coupled to the memory device and to the at least one wireless communication component, the processing device configured to:
   collect, on an ongoing basis, information pertaining to conditions experienced by the mobile device, the conditions experienced by the mobile device comprising mobile device usage, a data plan limit of the mobile device, or activities by a user of the mobile device;
   detect, from the information pertaining to the conditions experienced by the mobile device, that a trigger event has occurred;
   determine, upon detecting that the trigger event has occurred, that receiving or sending of information or content by the mobile device, in relation to the external device, is to be performed by the associated device; and
   send a command message to the associated device causing the associated device to send the information or content to, or receive the information or content from, the external device.

18. The method of claim 14, wherein the conditions experienced by the mobile device associated with connectivity of the mobile device to devices other than the associated device include whether the mobile device is being used at home or away from home, whether the mobile device is connected to a home network or a standard network, if there is a bandwidth limitation, or if the mobile device is roaming.

* * * * *